(12) United States Patent
Pelletier et al.

(10) Patent No.: US 8,700,087 B2
(45) Date of Patent: Apr. 15, 2014

(54) METHOD AND APPARATUS FOR SELECTING ENHANCED DEDICATED CHANNEL TRANSPORT FORMAT COMBINATION IN CELL_FACH STATE AND IDLE MODE

(75) Inventors: Benoit Pelletier, Roxboro (CA); Paul Marinier, Brossard (CA); Vincent Roy, Longueuil (CA); Diana Pani, Montreal (CA); Christopher R. Cave, Dollard-des-Ormeaux (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 144 days.

(21) Appl. No.: 13/338,435

(22) Filed: Dec. 28, 2011

(65) Prior Publication Data

US 2013/0003665 A1    Jan. 3, 2013

Related U.S. Application Data

(63) Continuation of application No. 12/408,128, filed on Mar. 20, 2009, now Pat. No. 8,107,991.

(60) Provisional application No. 61/038,176, filed on Mar. 20, 2008.

(51) Int. Cl.
*H04W 52/04* (2009.01)
*H04B 7/00* (2006.01)
*H04J 1/16* (2006.01)

(52) U.S. Cl.
USPC .......................... 455/522; 455/63.1; 370/252

(58) Field of Classification Search
CPC ............................ H04W 52/04; H04W 72/04
USPC .......................... 455/63.1, 517, 522; 370/252
See application file for complete search history.

(56) References Cited

U.S. PATENT DOCUMENTS

| 2003/0067883 A1 | 4/2003 | Arzenkot et al. |
| 2007/0173260 A1 | 7/2007 | Love et al. |

(Continued)

FOREIGN PATENT DOCUMENTS

| JP | 2009-261000 A | 11/2009 |
| WO | WO 2005/067659 A2 | 7/2005 |

OTHER PUBLICATIONS

3rd Generation Partnership Project (3GPP), R1-050755, "UE Power Headroom Measurement" Ericsson, 3GPP TSG RAN WG1 Meeting #42, London, UK, Aug. 29-Sep. 2, 2005, 8 pages.

(Continued)

*Primary Examiner* — Don Le
(74) *Attorney, Agent, or Firm* — Condo Roccia LLP

(57) ABSTRACT

A method and apparatus for selecting an enhanced dedicated channel (E-DCH) transport format combination (E-TFC) in Cell_FACH state and idle mode are disclosed. A wireless transmit/receive unit (WTRU) transmits a random access channel (RACH) preamble and receives an index to an E-DCH resource in response to the RACH preamble. The WTRU may estimate a power headroom based on the maximum WTRU transmit power, power offset value, and the last successfully transmitted RACH preamble transmit power. The WTRU restricts an E-TFC based on the estimated power headroom, and selects an E-TFC based on a set of supported E-TFCs. The WTRU then generates, and transmits, a protocol data unit (PDU) based on the selected E-TFC.

20 Claims, 2 Drawing Sheets

(56) References Cited

U.S. PATENT DOCUMENTS

| | | |
|---|---|---|
| 2009/0238136 A1 | 9/2009 | Sambhwani et al. |
| 2009/0286566 A1 | 11/2009 | Lindholm et al. |
| 2010/0041428 A1* | 2/2010 | Chen et al. .................... 455/522 |
| 2011/0080838 A1 | 4/2011 | Larsson et al. |

OTHER PUBLICATIONS

3rd Generation Partnership Project (3GPP), R1-074126, "L1/2 aspects for enhanced UL for CELL_FACH," Qualcomm Europe, 3GPP TSG-RAN WG1 #50-bis, Shanghai, China, Oct. 2007, 8 pages.
3rd Generation Partnership Project (3GPP), R1-080237, "Comparison of HS-based E-RACH resource assignment", NEC, 3GPP TSG-RAN WG1#51bis, Sevillia, Spain, Jan. 14-18, 2008, 6 pages.
3rd Generation Partnership Project (3GPP), R2-074964, "Signalling of Enhanced Uplink Configuration", LG Electronics, 3GPP TSG•RAN WG2 #60, Jeju, Korea, Nov. 5-9, 2007, 2 pages.
3rd Generation Partnership Project (3GPP), R4-060220, "Testing methodology for E-TFC restriction", Nokia, TSG-RAN Working Group 4 (Radio) meeting #38, Denver, USA, Feb. 13-17, 2006, 4 pages.
3rd Generation Partnership Project (3GPP), R4-070120, "Introduction of continuous packet connectivity (CPC) to ETFC restriction, UE transmitted power and UE transmission power headroom measurement requirements", 3GPP TSG-RAN4 Meeting #42, St Louis, USA, Feb. 12-16, 2006, 8 pages.
3rd Generation Partnership Project (3GPP), R4-082813, 3rd Generation Partnership Project; "UE Transmission Power Headroom Definition for E-DCH in CELL_FACH", Qualcomm Europe, Prague, Czech Republic, Nov. 10, 2008, 5 pages.
3rd Generation Partnership Project (3GPP), R4-090176, "Initial E-TFC restriction for enhanced uplink in cell FACH", Nokia et al, 3GPP TSG-RAN WG4#49bis, Meeting, R4-090176, Ljubljana, Sioveina, Jan. 12-16, 2009, 4 pages.
3rd Generation Partnership Project (3GPP), RP-080046, "Enhanced Uplink for CEll_FACH State in FDD", 3GPP WG2 TSG•RAN #39, Meeting, RP-080046, Puerto Vallarta, Mexio, Mar. 4-7, 2008, 5 pages.
3rd Generation Partnership Project (3GPP), TS 25.133 V8.2.0, "3rd Generation Partnership Project; Technical Specification Group Radio Access Network; Requirements for Support of Radio Resource Management (FDD) (Release 8)", Mar. 2008, 184 pages.
3rd Generation Partnership Project (3GPP), TS 25.133 V8.6.0, "3rd Generation Partnership Project; Technical Specification Group Radio Access Network; Requirements for Support of Radio Resource Management (FDD) (Release 8)", Mar. 2009, 1-207.
3rd Generation Partnership Project (3GPP), TS 25.321 V3.17.0, "3rd Generation Partnership Project; Technical Specification Group Radio Access Network; Medium Access Control (MAC) protocol specification (Release 1999)", Jun. 2004, 41 pages.
3rd Generation Partnership Project (3GPP), TS 25.321 V4.10.0, "3rd Generation Partnership Project; Technical Specification Group Radio Access Network; Medium Access Control (MAC) protocol specification (Release 4)", Jun. 2004, 43 pages.
3rd Generation Partnership Project (3GPP), TS 25.321 V5.13.0, "3rd Generation Partnership Project; Technical Specification Group Radio Access Network; MAC Protocol Specification (Release 5)", Mar. 2007, 58 pages.
3rd Generation Partnership Project (3GPP), TS 25.321 V5.14.0, "3rd Generation Partnership Project; Technical Specification Group Radio Access Network; MAC Protocol Specification (Release 5)", Sep. 2008, 58 pages.
3rd Generation Partnership Project (3GPP), TS 25.321 V6.15.0, "3rd Generation Partnership Project; Technical Specification Group Radio Access Network; MAC Protocol Specification (Release 6)", Mar. 2008, 94 pages.
3rd Generation Partnership Project (3GPP), TS 25.321 V6.18.0, "3rd Generation Partnership Project; Technical Specification Group Radio Access Network; Medium Access Control (MAC) protocol specification (Release 6)", Mar. 2009, 95 pages.
3rd Generation Partnership Project (3GPP), TS 25.321 V7.12.0, "3rd Generation Partnership Project; Technical Specification Group Radio Access Network, Medium Access Control (MAC) protocol specification (Release 7)", Mar. 2009, 149 pages.
3rd Generation Partnership Project (3GPP), TS 25.321 V7.7.0, "3rd Generation Partnership Project; Technical Specification Group Radio Access Network, Medium Access Control (MAC) protocol specification (Release 7)", Dec. 2007, 146 pages.
3rd Generation Partnership Project (3GPP), TS 25.321 V8.0.0, "3rd Generation Partnership Project; Technical Specification Group Radio Access Network, Medium Access Control (MAC) Protocol Specification (Release 8)", Dec. 2007, 146 pages.
3rd Generation Partnership Project (3GPP), TS 25.321 V8.4.0, "3rd Generation Partnership Project; Technical Specification Group Radio Access Network; Medium Access Control (MAC) protocol specification (Release 8)", Dec. 2008, 174 pages.
3rd Generation Partnership Project (3GPP), TS 25.331 V4.18.0, "3rd Generation Partnership Project; Technical Specification Group Radio Access Network; Radio Resource Control (RRC); Protocol Specification (Release 4)," Dec. 2007, 953 pages.
3rd Generation Partnership Project (3GPP), TS 25.331 V4.20.0, "3rd Generation Partnership Project; Technical Specification Group Radio Access Network; Radio Resource Control (RRC); Protocol Specification (Release 4)," Dec. 2008, 967 pages.
3rd Generation Partnership Project (3GPP), TS 25.331 V5.21.0, "3rd Generation Partnership Project; Technical Specification Group Radio Access Network; Radio Resource Control (RRC); Protocol Specification (Release 5)," Dec. 2007, 1045 pages.
3rd Generation Partnership Project (3GPP), TS 25.331 V5.23.0, "3rd Generation Partnership Project; Technical Specification Group Radio Access Network; Radio Resource Control (RRC); Protocol Specification (Release 5)", Dec. 2008, 1046 pages.
3rd Generation Partnership Project (3GPP), TS 25.331 V6.16.0, "3rd Generation Partnership Project; Technical Specification Group Radio Access Network; Radio Resource Control (RRC); Protocol Specification (Release 6)", Dec. 2007, 1252 pages.
3rd Generation Partnership Project (3GPP), TS 25.331 V6.21.0, "3rd Generation Partnership Project; Technical Specification Group Radio Access Network; Radio Resource Control (RRC); Protocol Specification (Release 6)", Mar. 2009, 1253 pages.
3rd Generation Partnership Project (3GPP), TS 25.331 V7.11.0, "3rd Generation Partnership Project ; Technical Specification Group Radio Access Network; Radio Resource Control (RRC); Protocol Specification (Release 7)", Dec. 2008, 1482 pages.
3rd Generation Partnership Project (3GPP), TS 25.331 V7.7.0, "3rd Generation Partnership Project; Technical Specification Group Radio Access Network; Radio Resource Control (RRC); Protocol Specification (Release 7)", Dec. 2007, 1469 pages.
3rd Generation Partnership Project (3GPP), TS 25.331 V8.1.0, "3rd Generation Partnership Project; Technical Specification Group Radio Access Network; Radio Resource Control (RRC); Protocol Specification (Release 8)", Dec. 2007, 1471 pages.
3rd Generation Partnership Project (3GPP), TS 25.331 V8.6.0, "3rd Generation Partnership Project; Technical Specification Group Radio Access Network; Radio Resource Control (RRC); Protocol Specification (Release 8)", Mar. 2009, 1673 pages.
3rd Generation Partnership Project(3GPP), R1-073059, LG Electronics Inc.,"Transport Format in RACH Signature", TSG RAN WG1#49bis, Orlando, USA, Jun. 25-29, 2007, 1-2.
3rd Generation Partnership Project(3GPP), R2-074013, "Collision Detection Mechanism in Enhanced Random Access with E-DCH", 3GPP TSG-RAN WG2 Meeting #59bis, Nokia Siemens Networks, Shanghai, China, Oct. 8-12, 2007, 1-2.
International Patent Application No. PCT/US2009/037703: International Search Report dated Jul. 15, 2009, 3 pages.
International Patent Application No. PCT/US2009/037703: Written Opinion dated Jul. 15, 2009, 6 pages.
International Patent Application No. PCT/US2009/037703: Notification of Transmittal of International Preliminary Report on Patentability dated Jun. 22, 2010, 7 pages.

* cited by examiner

METHOD AND APPARATUS FOR SELECTING ENHANCED DEDICATED CHANNEL TRANSPORT FORMAT COMBINATION IN CELL_FACH STATE AND IDLE MODE

CROSS REFERENCE TO RELATED APPLICATIONS

This application is a continuation of U.S. application Ser. No. 12/408,128 filed Mar. 20, 2009; which claims the benefit of U.S. provisional application No. 61/038,176 filed Mar. 20, 2008, which is incorporated by reference as if fully set forth.

FIELD OF INVENTION

This application is related to wireless communications.

BACKGROUND

It has recently been proposed, as part of third generation partnership project (3GPP) Release 8 work item applicable to high speed packet access (HSPA) systems, that wireless transmit/receive units (WTRUs) are allowed to transmit on an enhanced dedicated channel (E-DCH) in the CELL_FACH state or idle mode. The WTRUs are allowed to tap E-DCH resources without transitioning to CELL_DCH state, which is referred to as enhanced random access channel (E-RACH) access or E-DCH in CELL_FACH or idle mode.

An E-RACH access is a combination of a random access channel (RACH) preamble transmission phase and an E-DCH transmission phase. FIG. 1 shows an E-RACH access procedure. The RACH preamble transmission phase uses a subset of R99 RACH signatures that a Node B has designated or broadcast for use in E-RACH. The reception of a preamble by the Node B is acknowledged in an acquisition indication channel (AICH), which also assigns a WTRU with an index for a shared E-DCH resource to use. The shared E-DCH resources are pre-designated by the Node B for use in an E-RACH access in CELL_FACH state or idle mode. For all shared E-DCH resources, the parameters are provided to the WTRU during initial setup or broadcast to WTRUs in the cell by the Node B. Each E-DCH resource is associated with an index which is transmitted as part of the acknowledgement for the E-RACH access, or using some other signaling mechanism. Once the WTRU receives the index value, all configuration parameters related to the assigned shared E-DCH resource are known and the WTRU may start transmitting after a possible synchronization period.

In E-DCH (Release 6 and above), the WTRU selects the number of information bits to transmit at every transmission time interval (TTI) based on a set of pre-defined rules. Conceptually, this procedure includes a number of steps. First, the WTRU determines the amount of power it can use for data transmission. To this end, the WTRU measures its power headroom, which is defined as the ratio between the maximum transmission power and the power of the dedicated physical control channel (DPCCH). The maximum transmission power is a known parameter at the WTRU. It is either determined by the WTRU category or signaled by the network. Thus, whenever the WTRU has an estimate of the DPCCH power, the WTRU can calculate the power headroom estimate. In this context power headroom estimation and DPCCH power estimation have a direct relationship. Since the DPCCH power is subjected to variations at every radio slot in response to power control commands from the network, the WTRU filters the DPCCH slot-wise power estimates over a period of one TTI, (i.e., 3 radio slots for 2 ms TTI and 15 radio slots for 10 ms TTI). In a second step, the WTRU uses this power headroom to determine the set of transport format that can be used for transmission, also referred to as the set of supported E-DCH transport format combinations (E-TFCs). An E-TFC that is in the set of supported E-TFCs is said to be in supported state. This step may be referred to as E-TFC restriction. Finally, the WTRU determines how many bits will be transmitted in the coming TTI from each MAC-d flow (up to the maximum supported E-TFC) based on the serving grant, non-scheduled grant, reference E-TFCs, hybrid automatic repeat request (HARQ) profiles, multiplexing list, etc. This step is referred to as E-TFC selection in the 3GPP specifications.

When the WTRU initiates E-DCH transmission in CELL_FACH state or idle mode, the WTRU may not know the power headroom or may not have a sufficiently accurate power headroom estimate to carry out the E-TFC selection functions and protocol data unit (PDU) creation procedures in time for the start of the E-DCH dedicated physical data channel (E-DPDCH) transmission. Therefore, it would be desirable to provide a method for power headroom estimation that would allow the WTRU to perform E-TFC selection functions and PDU creation procedures before that point. It is further desirable to provide such an estimation method for reporting UE transmission power headroom (UPH) measurements when the scheduling information (SI) containing the UPH is transmitted before the measurement is considered sufficiently reliable.

SUMMARY

A method and apparatus for selecting an E-TFC in Cell_FACH state and idle mode are disclosed. A WTRU transmits an RACH preamble and receives an index to an E-DCH resource in response to the RACH preamble. The WTRU may estimate a power headroom based on the maximum WTRU transmit power, a power offset value, and the last transmitted RACH preamble transmit power. The WTRU restricts an E-TFC based on the estimated power headroom, and selects an E-TFC based on a set of supported E-TFCs. The WTRU then generates, and transmits, a protocol data unit (PDU) based on the selected E-TFC.

Alternatively, the WTRU may estimate the power headroom based on the downlink measurement and uplink noise and interference level. The downlink measurement may be a common pilot channel (CPICH) received signal code power (RSCP) measurement. Alternatively, the WTRU may select an E-TFC from a minimum E-TFC set within a default serving grant. Alternatively, the WTRU may select an E-TFC assuming that all E-TFCs are available for the first N E-DCH transmissions independently of radio conditions.

BRIEF DESCRIPTION OF THE DRAWINGS

A more detailed understanding may be had from the following description, given by way of example in conjunction with the accompanying drawings.

DETAILED DESCRIPTION

Figure 1:
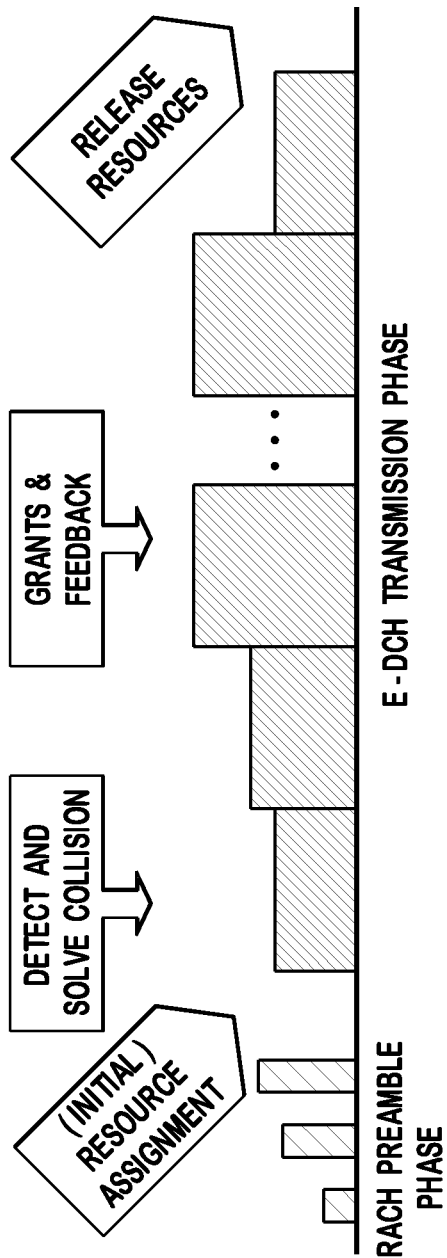
FIG. 1 shows an E-RACH access procedure.

When referred to hereafter, the terminology "WTRU" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment. Together, E-TFC restriction and E-TFC selection are referred to as E-TFC selection functions hereinafter.

Embodiments disclosed herein are related to power headroom estimation and to the selection of an E-TFC in the absence of the initial WTRU power headroom information at the WTRU. The embodiments are applicable to 3GPP HSPA wireless communication systems and any other wireless communication systems.

In accordance with a first embodiment, a WTRU is configured to determine an estimate of the power headroom based on downlink measurements and an uplink interference level. The uplink interference level information may be signaled from a Node B, or assumed by the WTRU. The WTRU may determine the estimate of the WTRU power headroom as follows:

$$\text{Power\_Headroom} = \text{Max\_WTRU\_Tx\_Power} + \text{CPICH\_RSCP} - \text{Uplink\_Noise\_plus\_Interference} + K; \quad \text{Equation (1)}$$

where Max_WTRU_Tx_Power is the maximum transmission power of the WTRU, CPICH_RSCP is the received signal code power (RSCP) of the common pilot channel (CPICH) of the cell being accessed, Uplink_Noise_plus_Interference is the sum of thermal noise and interference at the base station antenna, and K is a pre-determined constant whose value depends on factors that do not change significantly in different situations, (e.g., required signal-to-interference ratio (SIR) of the DPCCH, margins, or the like). CPICH_RSCP may be filtered at Layer 3 to reduce variations due to fast fading. Uplink_Noise_plus_Interference value may be pre-determined based on conservative estimates of the maximum noise rise at the Node B, or may be signaled by the Node B over system information.

Once the WTRU has determined the estimate of the power headroom, the WTRU may execute the E-TFC selection functions (including E-TFC restriction and E-TFC selection) based on the power headroom estimate and optionally based on a default grant signaled over system information. The E-TFC selected is then used for PDU creation and transmission. Optionally, the first E-DCH transmission uses this approach for E-TFC selection and the following transmissions may use the normal power headroom estimate for E-TFC selection functions.

The WTRU may estimate the power headroom in accordance with the first embodiment either for the initial E-DCH transmission or for one or a combination of any of the following durations:

(1) The first N E-DCH transmissions;
(2) The first M transmission time intervals (TTIS) or any other pre-determined time units, (e.g., radio slots, frames, etc.);
(3) The first K DPCCH slots or transmit power control (TPC) commands that are sent to the Node B and/or received from the Node B; and
(4) Until the first real power headroom determination, (i.e., the headroom is calculated from an actual DPCCH power measurement), and E-TFC selection functions based on this power headroom measurement have been completed. Once such an E-TFC has been selected, the WTRU may resume normal E-TFC selection functions.

Figure 2:
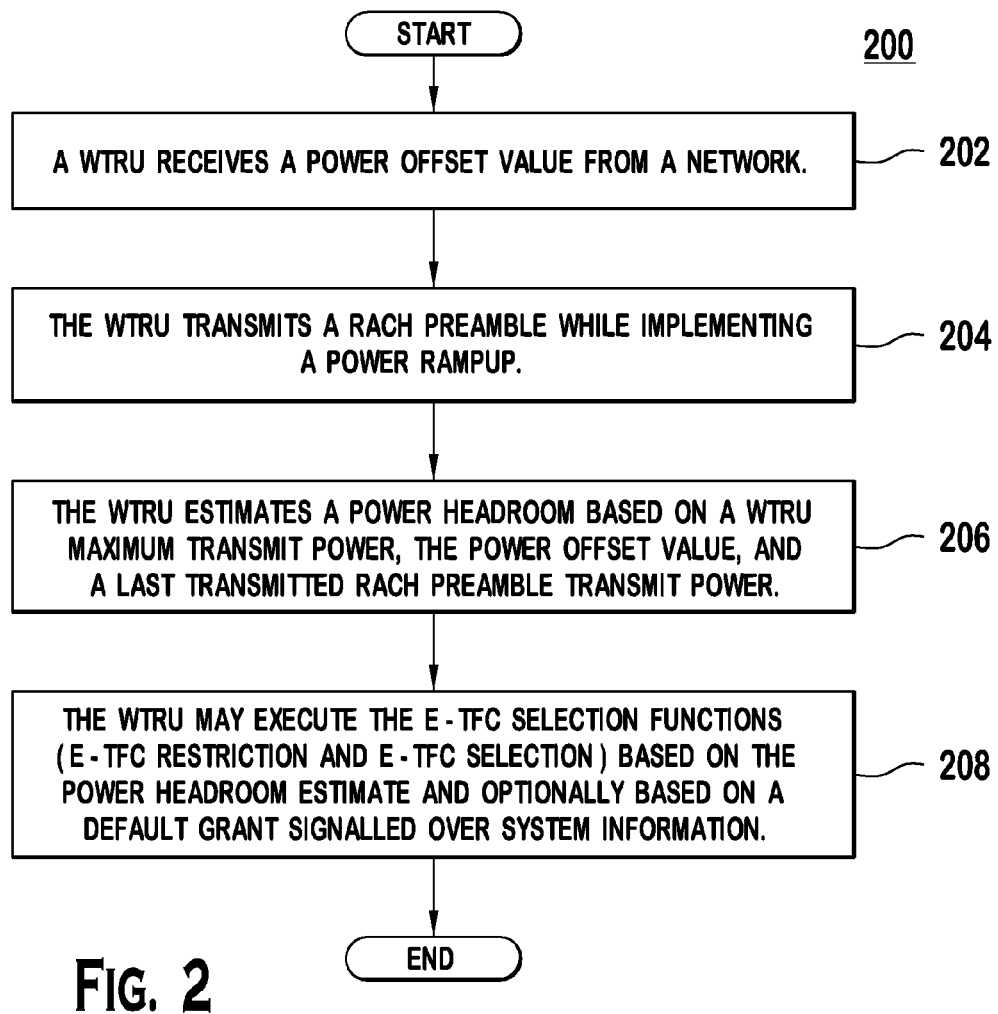
FIG. 2 is a block diagram of an example WTRU in accordance with one embodiment.

In accordance with a second embodiment, the WIRU is configured to estimate the WIRU power headroom based on the transmission power used for the RACH preamble and is configured to perform E-TFC selection functions using the estimated power headroom. FIG. 2 is a flow diagram of an example process 200 of estimating a power headroom and selecting an E-TFC in Cell_FACH state and idle mode in accordance with the second embodiment. A WTRU may receive a power offset value from a network (step 202). The power offset value may be predetermined. The WIRU transmits a RACH preamble while implementing a power ramp-up (step 204). The WTRU estimates a power headroom based on a WTRU maximum transmit power, the power offset value and a last transmitted RACH preamble transmit power (step 206).

The power headroom may be calculated as follows:

$$\text{Power Headroom} = \text{Max\_WTRU\_Tx\_Power} - \text{Preamble\_Tx\_Power} - \text{Offset}; \quad \text{Equation (2)}$$

where Preamble_Tx_Power is the transmit power of the last successfully transmitted RACH preamble, and Offset is a power offset that may be pre-determined or calculated based on a value signaled over system information.

Once the WTRU has determined the estimate of the power headroom, the WTRU may execute the E-TFC selection functions (E-TFC restriction and E-TFC selection) based on the power headroom estimate and optionally based on a default grant signaled over system information (step 208). The E-TFC selected is then used for PDU creation and transmission. Optionally, the first E-DCH transmission uses this approach for E-TFC selection and the following transmissions may use the normal power headroom estimate for E-TFC selection functions.

When the WTRU receives an ACK on AICH, the E-DCH resource is allocated and the WTRU uses the power headroom estimated based on the transmission power of the corresponding RACH preamble for the E-TFC selection functions. The E-TFC selected is then used for PDU creation for the initial E-DCH transmission.

Alternatively, the WTRU may carry out power headroom estimation every time a RACH preamble is transmitted during the power ramp-up. The WTRU then uses the last value of the power headroom to carry out the E-TFC selection functions and create the PDU for the initial E-DCH transmission.

Alternatively, the WTRU may carry out power headroom estimation and E-TFC restriction every time a RACH preamble is transmitted during the power ramp-up. The WTRU then uses the last set of supported E-TFC to carry out E-TFC selection and PDU creation for E-DCH transmission.

Alternatively, the WTRU may carry out power headroom estimation and E-TFC functions (including E-TFC restriction and E-TFC selection) every time a RACH preamble is transmitted during the power ramp-up. The WTRU then uses the E-TFC selected to create the PDU for E-DCH transmission.

Alternatively, the WTRU may carry out power headroom estimation, E-TFC functions (including E-TFC restriction and E-TFC selection) and PDU creation every time a RACH preamble is transmitted during the power ramp-up. The WTRU then uses the last PDU created for the E-DCH transmission.

The WTRU may estimate the power headroom in accordance with the second embodiment either for the initial E-DCH transmission or for one or a combination of any of the following durations:

(1) The first N E-DCH transmissions;
(2) The first M transmission time intervals (TTIs) or any other pre-determined time units, (e.g., radio slots, frames, etc.);
(3) The first K DPCCH slots or transmit power control (TPC) commands that are sent to the Node B and/or received from the Node B; and
(4) Until the first real power headroom determination, (e.g., after sending the DPCCH), and E-TFC selection has been completed. Once an E-TFC has been correctly selected the WTRU may continue with the selected E-TFC.

The WTRU may also use the power headroom estimated in accordance with the first or second embodiment to report the UE power headroom (UPH) if an SI is triggered while the actual power headroom is considered unreliable, (e.g., for the first or first few E-DCH transmissions in CELL_FACH, or for a predetermined duration).

In accordance with a third embodiment, a WTRU is configured to select an E-TFC from a minimum E-TFC set. The minimum E-TFC set is pre-configured or signaled by a network. The WTRU selects an E-TFC from the minimum E-TFC set either for the initial E-DCH transmission or for one or a combination of any of the following durations, independently of the power headroom:
(1) The first N E-DCH transmissions;
(2) The first M TTIs or any other pre-determined time units, (e.g., radio slots, frames, etc.);
(3) The first K DPCCH slots or TPC commands that are sent to the Node B and/or received from the Node B; and
(4) Until the first real power headroom determination, (i.e., the headroom is calculated from an actual DPCCH power measurement), and E-TFC selection functions based on this power headroom measurement have been completed. Once such an E-TFC has been selected, the WTRU may resume normal E-TFC selection functions.

The minimum E-TFC set may be pre-determined or signaled over system information. The WTRU may choose the minimum value from the minimum E-TFC set. Alternatively, the WTRU may choose a higher E-TFC value based on a power headroom estimated in accordance with the embodiments described above and/or based on the amount of data the WTRU has available for transmission. The value selected from the minimum E-TFC set should not correspond to a higher grant than the default grant provided in the system information block (SIB).

A minimum E-TFC may be applied until the WTRU receives a new absolute grant from the Node B over an E-DCH absolute grant channel (E-AGCH) that is associated with the E-DCH resource, or until the WTRU receives a relative grant over an E-DCH relative grant channel (E-RGCH) indicating to increase its current serving grant. Alternatively, the minimum E-TFC may be applied until collision resolution is resolved. For common control channel (CCCH) transmissions the minimum E-TFC may be applied for the duration of the transmission.

In accordance with a fourth embodiment, a WTRU is configured to assume that the power headroom does not limit the E-TFC in its calculations for the initial E-TFC selection (or N first E-TFC selections or N first TTIs), independent of the actual radio conditions. In other words, the WTRU assumes that all E-TFCs within the limit of the default grant are in the supported state, (i.e., there is no E-TFC restriction per say), in the calculation of the E-TFC for the initial or N first E-TFC selections. The WTRU continues normal operation, (i.e., E-TFC restriction is carried out so that not all possible E-TFCs are in supported state), as soon as a real determination of the power headroom is available.

The WTRU may select an E-TFC in accordance with the fourth embodiment either for the initial E-DCH transmission or for one or a combination of any of the following durations:
(1) The first N E-DCH transmissions;
(2) The first M TTIs or any other pre-determined time units, (e.g., radio slots, frames, etc.);
(3) The first K DPCCH slots or TPC commands that are sent to the Node B and/or received from the Node B; and
(4) Until the first real power headroom determination, (i.e., the headroom is calculated from an actual DPCCH power measurement), and E-TFC selection functions based on this power headroom measurement have been completed. Once such an E-TFC has been selected, the WTRU may resume normal E-TFC selection functions.

Figure 3:
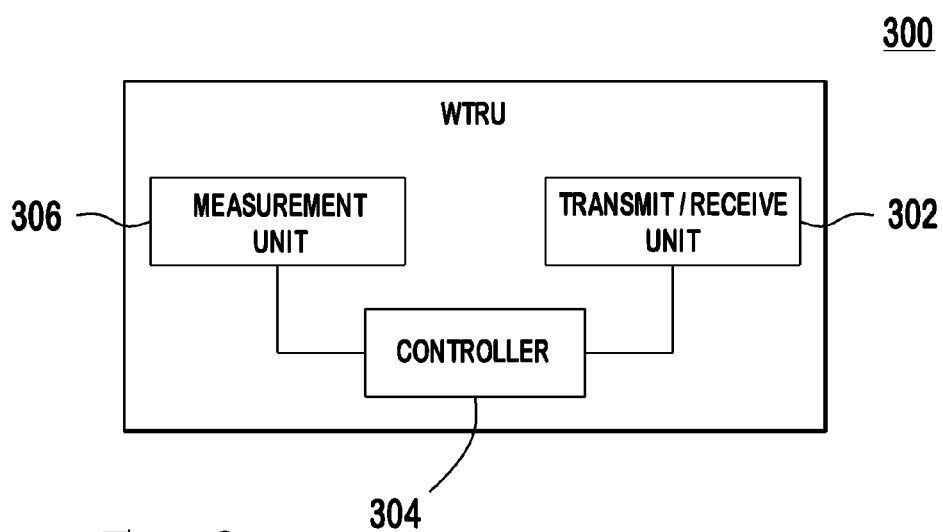
FIG. 3 is a block diagram of an example WTRU in accordance with one embodiment.

FIG. 3 is a block diagram of an example WTRU 300 in accordance with one embodiment. The WTRU 300 includes a transmit/receive unit 302, a controller 304, and a measurement unit 306. The transmit/receive unit 302 is configured to transmit a RACH preamble, receive an index to an E-DCH resource in response to the RACH preamble, and generate an E-DCH transmission using the selected E-TFC. The controller 304 is configured to select an E-TFC in accordance with any one of the embodiments disclosed above. The controller 304 may select the E-TFC based on estimated power headroom calculated based on a WTRU maximum transmit power, downlink measurement generated by the measurement unit 306, and an uplink noise and interference level. Alternatively, the controller 304 may select the E-TFC based on estimated power headroom calculated based on the WTRU maximum transmit power, a power offset value, and the last transmitted RACH preamble power. Alternatively, the controller 304 may select an E-TFC from a minimum E-TFC set within a default serving grant. Alternatively, the controller 304 may select an E-TFC assuming that all E-TFCs are available for first N E-DCH transmissions independently of radio conditions within a default grant.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method for performing enhanced dedicated channel (E-DCH) transport format combination (E-TFC) restriction for E-DCH transmissions in a Cell Forward Access Channel (Cell_FACH) state or an idle mode, the method comprising:
   a wireless transmit/receive unit (WTRU) transmitting a random access channel (RACH) preamble;
   the WTRU receiving an index to an E-DCH resource in response to the RACH preamble;
   the WTRU estimating a power headroom for at least an initial E-TFC restriction based on at least a WTRU maximum transmit power, a power offset value and a last transmitted RACH preamble transmit power; and
   the WTRU performing E-TFC restriction to determine a set of supported E-TFCs based on the estimated power headroom.

2. The method of claim 1, wherein the WTRU estimates the power headroom for a predetermined duration following reception of the index.

3. The method of claim 1, wherein the WTRU bases the E-TFC restriction on the estimated power headroom for a duration of a variable number of first dedicated physical control channel (DPCCH) slots or of a variable number of first transmission time intervals (TTIs).

4. The method of claim 3, wherein after the duration, the E-TFC restriction is calculated based on a DPCCH power measurement.

5. The method of claim 1, wherein the WTRU receives the power offset value via system information.

6. The method of claim 1, further comprising:
   the WTRU selecting an E-TFC from the set of supported E-TFCs;
   the WTRU generating a protocol data unit (PDU) based on the selected E-TFC; and
   the WTRU transmitting the PDU.

7. The method of claim 1, further comprising the WTRU sending scheduling information including the estimated power headroom to a network.

8. The method of claim 1, wherein the WTRU estimates the power headroom and performs E-TFC restriction every time a RACH preamble is transmitted during power ramp-up.

9. The method of claim 1, wherein the WTRU estimates the power headroom, performs E-TFC restriction, selects an E-TFC, and generates a PDU every time a RACH preamble is transmitted during power ramp-up.

10. The method of claim 1, wherein the WTRU performs the E-TFC restriction based on the estimated power headroom for a first E-DCH transmission following a RACH preamble transmission.

11. A wireless transmit/receive unit (WTRU) for performing (E-DCH) transport format combination (E-TFC) restriction for E-DCH transmissions in a Cell Forward Access Channel (Cell_FACH) state or an idle mode, the WTRU comprising:
   a transmit/receive unit configured to transmit a random access channel (RACH) preamble, receive an index to an E-DCH resource in response to the RACH preamble; and
   a controller configured to estimate a power headroom for at least an initial E-TFC restriction based on a WTRU maximum transmit power, a power offset value, and a last transmitted RACH preamble transmit power, and perform E-TFC restriction based on the estimated power headroom to determine a set of supported E-TFCs.

12. The WTRU of claim 11, wherein the controller is configured to estimate the power headroom for a predetermined duration following reception of the index.

13. The WTRU of claim 11, wherein the controller is configured to base the E-TFC restriction on the estimated power headroom for a duration of a variable number of first dedicated physical control channel (DPCCH) slots or of a variable number of first transmission time intervals (TTIs).

14. The WTRU of claim 13, wherein, after the duration, the controller is configured calculate the E-TFC restriction based on a DPCCH power measurement.

15. The WTRU of claim 11, wherein the transmit/receive unit is configured to receive the power offset value via system information.

16. The WTRU of claim 15, wherein the controller is configured to select an E-TFC from the set of supported E-TFCs, generate a protocol data unit (PDU) based on the selected E-TFC, and transmit the PDU.

17. The WTRU of claim 15, wherein the transmit/receive unit is configured to send scheduling information including the estimated power headroom to a network.

18. The WTRU of claim 15, wherein the controller is configured to estimate the power headroom and perform E-TFC restriction every time a RACH preamble is transmitted during power ramp-up.

19. The WTRU of claim 15, wherein the controller is configured to estimate the power headroom, perform E-TFC restriction, select an E-TFC, and generate a PDU every time a RACH preamble is transmitted during power ramp-up.

20. The WTRU of claim 15, wherein the controller is configured to perform the E-TFC restriction based on the estimated power headroom for a first E-DCH transmission following a RACH preamble transmission.

* * * * *